(12) United States Patent
Honegger et al.

(10) Patent No.: US 9,604,332 B2
(45) Date of Patent: Mar. 28, 2017

(54) FAST LIVE TOOL SYSTEM

(71) Applicant: MICROLUTION INC., Chicago, IL (US)

(72) Inventors: Andrew Honegger, Chicago, IL (US); Andrew Phillip, Forest Park, IL (US); Onik Bhattacharyya, Joliet, IL (US); Brendon DiVincenzo, Chicago, IL (US)

(73) Assignee: MICROLUTION INC., Chicago, IL (US)

( * ) Notice: Subject to any disclaimer, the term of this patent is extended or adjusted under 35 U.S.C. 154(b) by 0 days.

(21) Appl. No.: 14/243,164

(22) Filed: Apr. 2, 2014

(65) Prior Publication Data

US 2014/0301801 A1 Oct. 9, 2014

Related U.S. Application Data

(60) Provisional application No. 61/808,297, filed on Apr. 4, 2013.

(51) Int. Cl.
| | |
|---|---|
| *B23Q 3/16* | (2006.01) |
| *B23Q 1/34* | (2006.01) |
| *B23Q 5/32* | (2006.01) |
| *B23Q 5/28* | (2006.01) |
| *B23Q 15/013* | (2006.01) |
| *B23Q 15/007* | (2006.01) |
| *B23Q 17/22* | (2006.01) |

(52) U.S. Cl.
CPC .............. *B23Q 3/16* (2013.01); *B23Q 1/34* (2013.01); *B23Q 5/28* (2013.01); *B23Q 5/32* (2013.01);
(Continued)

(58) Field of Classification Search
CPC .... B23Q 15/013; B23Q 15/007; B23Q 17/22; B23Q 17/2233; B23Q 2210/002;
(Continued)

(56) References Cited

U.S. PATENT DOCUMENTS

| 4,658,485 A | * | 4/1987 | Yang | ...................... B23Q 1/012 29/26 A |
|---|---|---|---|---|
| 5,073,912 A | * | 12/1991 | Kobayashi | ............... B23Q 1/34 250/491.1 |

(Continued)

FOREIGN PATENT DOCUMENTS

| DE | 10229134 | 1/2004 |
|---|---|---|
| JP | H06-31576 | 2/1994 |
| WO | 2012/126840 | 9/2012 |

OTHER PUBLICATIONS

Machine translation of DE 10229134 A1.*
(Continued)

*Primary Examiner* — Daniel Howell
*Assistant Examiner* — Yasir Diab
(74) *Attorney, Agent, or Firm* — McDonnell Boehnen Hulbert & Berghoff LLP

(57) ABSTRACT

A machine tool accessory including a monolithic flexure travel guide, a motor, and a position feedback sensor is provided. The machine tool accessory also includes an accessory tool spindle configured to rotate a tool, the accessory tool spindle being disposed within the monolithic flexure travel guide. The motor is configured to move the monolithic flexure travel guide, and the position feedback sensor is configured to measure position of the monolithic flexure travel guide. In some embodiments, the machine tool accessory further includes a controller configured to (i) communicatively couple to the motor, (ii) communicatively couple to one or more external devices, and (iii) cause the motor to move the accessory tool spindle in response to signals received from the one or more external devices.

12 Claims, 6 Drawing Sheets

(52) U.S. Cl.
CPC .......... *B23Q 15/007* (2013.01); *B23Q 15/013* (2013.01); *B23Q 17/22* (2013.01); *B23Q 17/2233* (2013.01); *B23Q 2210/002* (2013.01); *Y10T 409/30448* (2015.01); *Y10T 409/306832* (2015.01); *Y10T 409/307224* (2015.01); *Y10T 409/307952* (2015.01); *Y10T 409/308008* (2015.01)

(58) Field of Classification Search
CPC ... B23Q 5/28; B23Q 5/32; Y10T 409/306832; Y10T 409/307224; Y10T 409/307952; Y10T 409/308008
See application file for complete search history.

(56) References Cited

U.S. PATENT DOCUMENTS

| | | | | |
|---|---|---|---|---|
| 5,537,186 A | * | 7/1996 | Korenaga | B23Q 1/601 355/53 |
| 5,718,545 A | * | 2/1998 | Husted | B23Q 5/045 409/201 |
| 6,357,094 B1 | * | 3/2002 | Sugimoto | B23Q 1/012 29/26 A |
| 6,453,211 B1 | * | 9/2002 | Randolph, Jr. | B23C 3/18 700/192 |
| 6,746,188 B2 | * | 6/2004 | Watanabe | B23Q 1/70 409/201 |
| 6,903,346 B2 | * | 6/2005 | Sogard | G03F 7/707 250/442.11 |
| 7,417,714 B2 | * | 8/2008 | Binnard | G03F 7/70716 355/53 |
| 2003/0118416 A1 | * | 6/2003 | Murakami | B23Q 15/013 409/132 |

OTHER PUBLICATIONS

Machine translation of JPH0631576.*
International Search Report and Written Opinion for Int. App. No. PCT/US2014/032631, mailed Jul. 11, 2014.

* cited by examiner

FAST LIVE TOOL SYSTEM

CROSS REFERENCE TO RELATED APPLICATIONS

The present application is a non-provisional application of U.S. Ser. No. 61/808,297 filed on Apr. 4, 2013, the contents of which are fully incorporated by reference herein.

FIELD OF THE INVENTION

The present application relates generally to machine tools, and more particularly to a machine tool configured to perform small-scale, high accuracy machining or lathe operations.

BACKGROUND

Machine tools are used to manufacture parts by a mechanical cutting process using cutting tools. Machine tools may be manually operated, mechanically automated, or digitally automated via computer numerical control (CNC). Machine tools may include a plurality of tool accessories to be used with the machine tool.

SUMMARY

The present application discloses a machine tool accessory including a monolithic flexure travel guide, an accessory tool spindle configured to rotate a tool, the accessory tool spindle being disposed within the monolithic flexure travel guide, a motor configured to move the monolithic flexure travel guide, and a position feedback sensor configured to measure position of the monolithic flexure travel guide. In some embodiments, the machine tool accessory further includes a controller configured to (i) communicatively couple to the motor, (ii) communicatively couple to one or more external devices, and (iii) cause the motor to move the accessory tool spindle in response to signals received from the one or more external devices.

BRIEF DESCRIPTION OF THE FIGURES

Exemplary embodiments of the invention are described herein with reference to the drawings, in which.

DETAILED DESCRIPTION

Disclosed herein are embodiments of a machine tool accessory. Generally, the machine tool accessory is configured to be mounted on a moveable tool stage of a machine tool, such as a lathe, a milling machine, or other similar machine to perform high-speed, high accuracy machining operations. The machine tool accessory includes a spindle which may be configured to hold and, at times, perhaps rotate a cutting tool about its axis and a small linear actuator that is configured to hold and, at times, perhaps move the accessory spindle in a lateral direction relative to the axis of the accessory spindle.

As a general matter, a machine tool typically includes a main spindle, which may be configured to hold and, at times, perhaps rotate a work piece or a cutting tool about its axis. In some embodiments, the main spindle is mounted on a main stage, which may be moveable along one or more axes. Typically the stage which moves in the direction of the axis of the main spindle is referred to as the Z-stage. A machine tool also typically includes at least one other stage. A stage generally has a table onto which one or more cutting tools and/or tool accessories and/or work pieces are affixed and may be moveable along one or more axes in such a way so that the tools and/or accessories and/or work pieces affixed thereto come into contact with and perhaps manipulate a stationary or rotating work piece or are manipulated by a stationary or rotating cutting tool.

Figure 1:
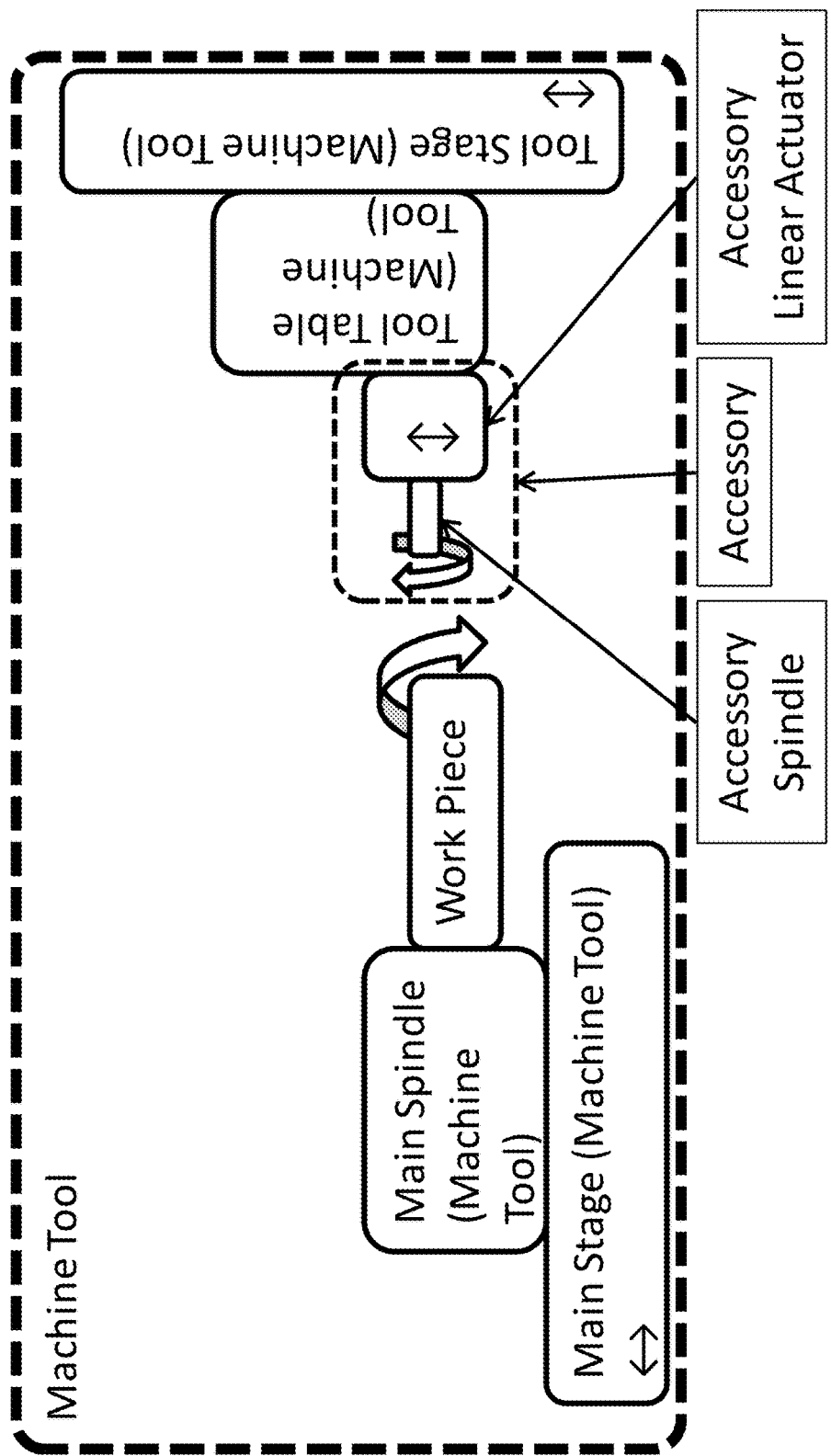
FIG. 1 shows an example system layout within a machine tool according to an embodiment.

In accordance with one embodiment, and shown in FIG. 1, a machine tool accessory is mounted on a tool table and includes its own spindle, which may be configured to hold and perhaps rotate a tool. In operation, the tool table may be moved about the machine tool in order to bring the tool accessory in contact with the work piece, thereby carrying out specific types of machining operations, such as milling or drilling the work piece. In some implementations, the tool stage is rather large, and as a result, the tools mounted thereon may not be able to engage in small-scale or high-accuracy lathe operations due to the relatively poor path-following accuracy and the relatively slow speed that is associated with large tool stages. In these implementations, the machine tool accessory is configured such that the tool stage can be held stationary while the accessory spindle rotates and the accessory linear actuator moves in such a way as to manipulate the work piece.

Figure 2A:
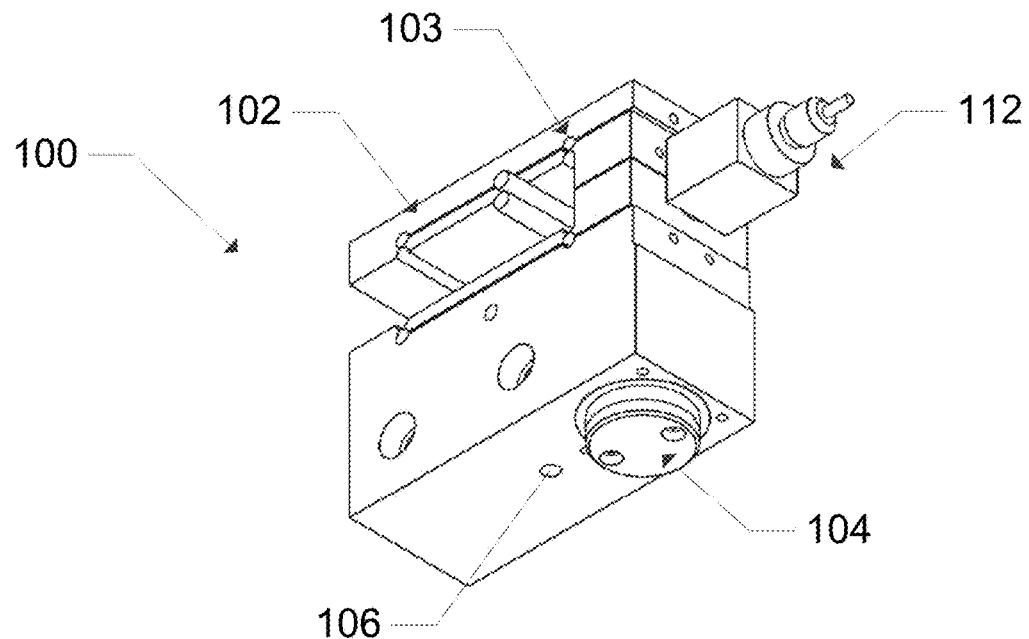
FIG. 2A is a perspective view of a machine tool accessory to an embodiment.
Figure 2B:
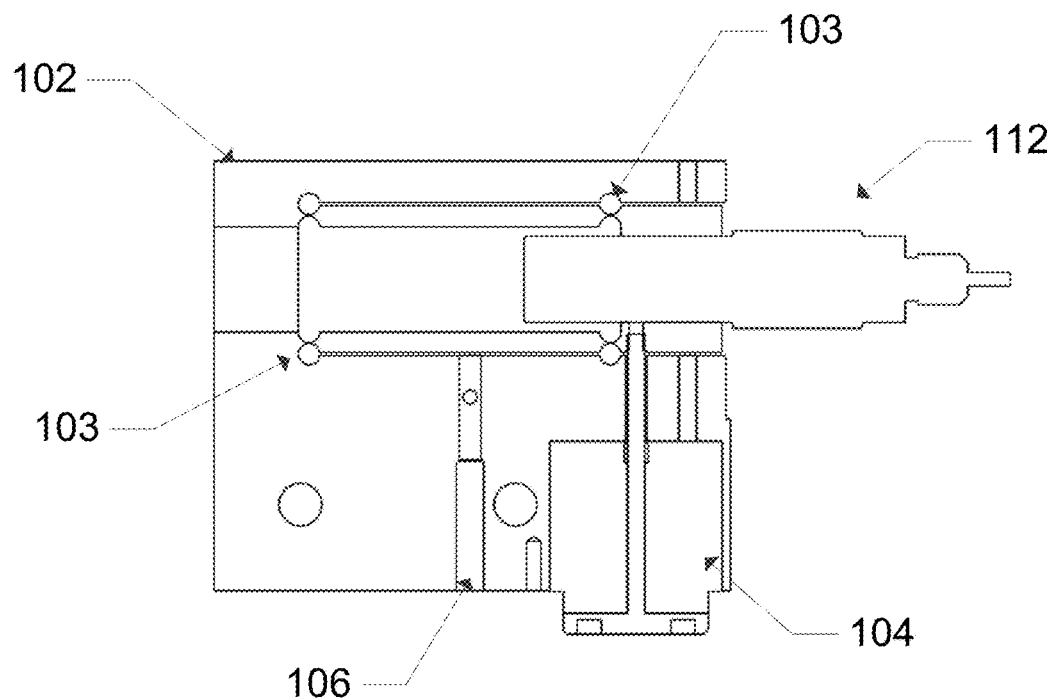
FIG. 2B is a side, cross-sectional view of the machine tool accessory shown in FIG. 2A.
Figure 3:
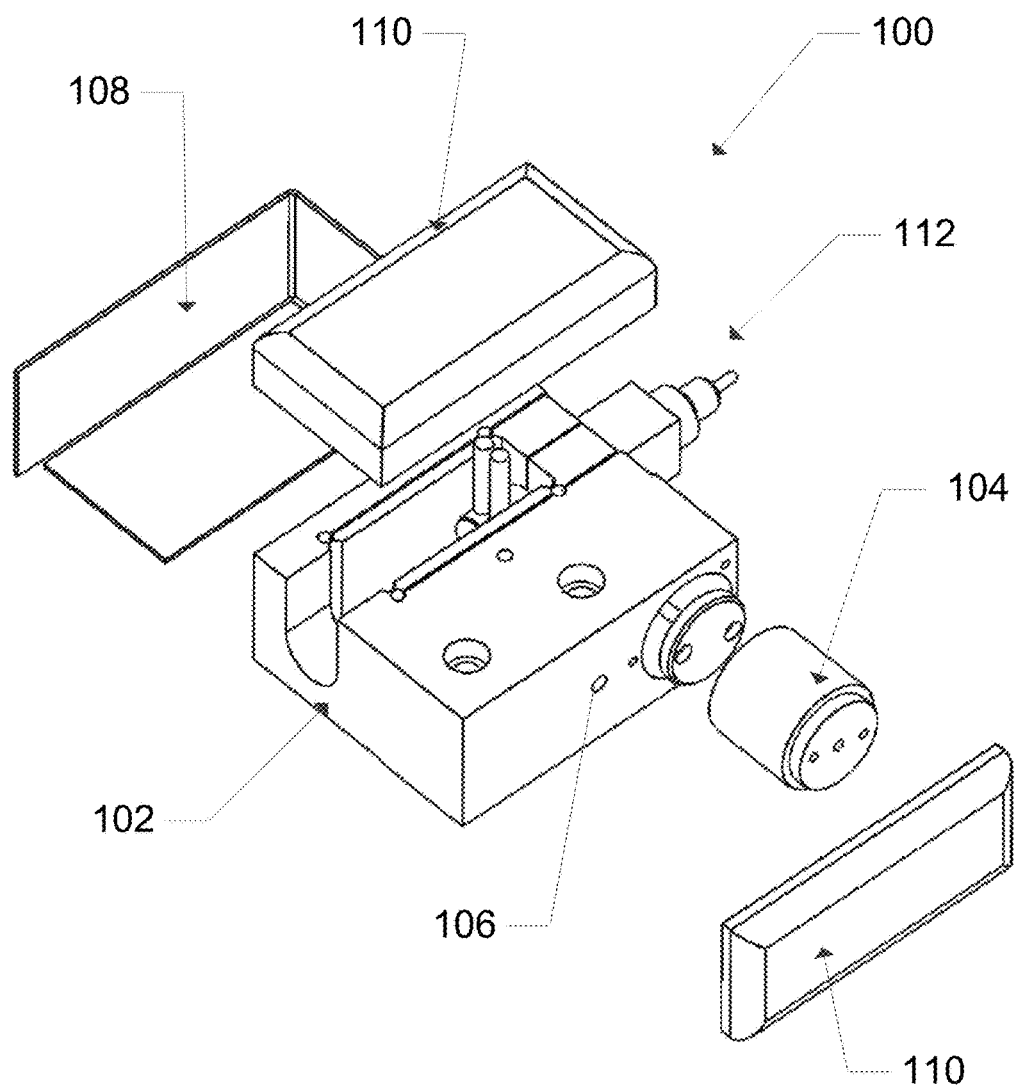
FIG. 3 is an exploded view of the machine tool accessory shown in FIG. 2A.

FIGS. 2A, 2B, and 3 show an example machine tool accessory 100, in accordance with one embodiment. As depicted, the machine tool accessory 100 comprises a linear actuator which includes a monolithic flexure travel guide 102 which also serves as the base of the accessory having a spindle clamp, a motor 104, and a position feedback sensor 106. The machine tool accessory 100 also includes a sheet metal cover 108, and one or more machined covers 110. In one example, the monolithic flexure guide/base 102 allows 1 millimeter displacement. However, in other embodiments, other displacements are possible. The monolithic flexure guide/base 102 may be made of steel or some other material. In FIGS. 2A and 2B, the flexure guide/base 102 is designed as a monolithic four-bar linkage with thin, flexible sections 103 at the ends of the bars to allow motion in one direction while remaining stiff in the other directions. The flexure design enables the device to provide accurate motion while also being compact. Other monolithic flexure designs may also be used.

In addition, the machine tool accessory 100 includes a spindle 112, suitable for use in high-accuracy, small scale machining operations. For example, a spindle used in the machine tool accessory would feature a small overall size, high maximum speed (rpm), moderate power capability and high accuracy. The spindle shown in the figures is one example and is operable at 80,000 RPM at 125 Watts with a 19.05 millimeter diameter and total indicated runout of 0.002 mm. In other examples, the spindle may be operable at between about 20,000 and about 100,000 RPM at about 10 to about 300 Watts, with about a 15 mm diameter to about a 30 mm diameter, and a total indicated runout of less than 0.001 mm to about 0.005 mm.

As further depicted, the machine tool accessory includes a motor 104, such as a voice coil operable at 20 pounds peak force. However, in other embodiments, other types of motors are possible, such as an AC Linear Motor, a piezo-electric motor, a capstan-drive or other devices. FIGS. 2A and 2B show an example location of the voice coil motor 104, which is connected to the mechanism via a linkage such that the motor can cause the actuator to move in the direction provided by the monolithic flexure guide/base 102. The voice coil or similar motor provides a small overall size and allows the actuator to move with high speed and acceleration.

The machine tool accessory 100 also includes a position feedback sensor 106, such as an eddy current sensor or a capacitive displacement sensor. The position feedback sensor 106 is connected to the accessory 100 in such a way as to measure the displacement of the motor 104 and monolithic flexure guide/base 102. By way of example, other types of feedback sensors that may be used include inductive sensors, optical sensors, magnetic sensors, or any other type of sensor now known or later developed that is configured to measure the displacement of the tool accessory actuator.

Figure 4A:
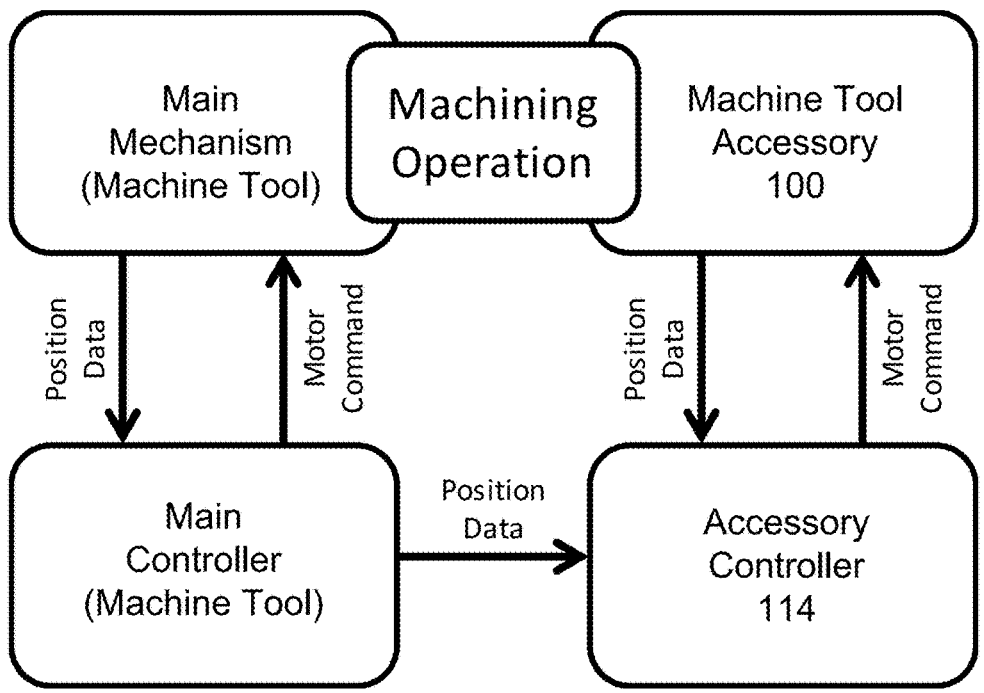
FIG. 4A shows one embodiment of a system with a machine tool accessory including a controller.
Figure 4B:
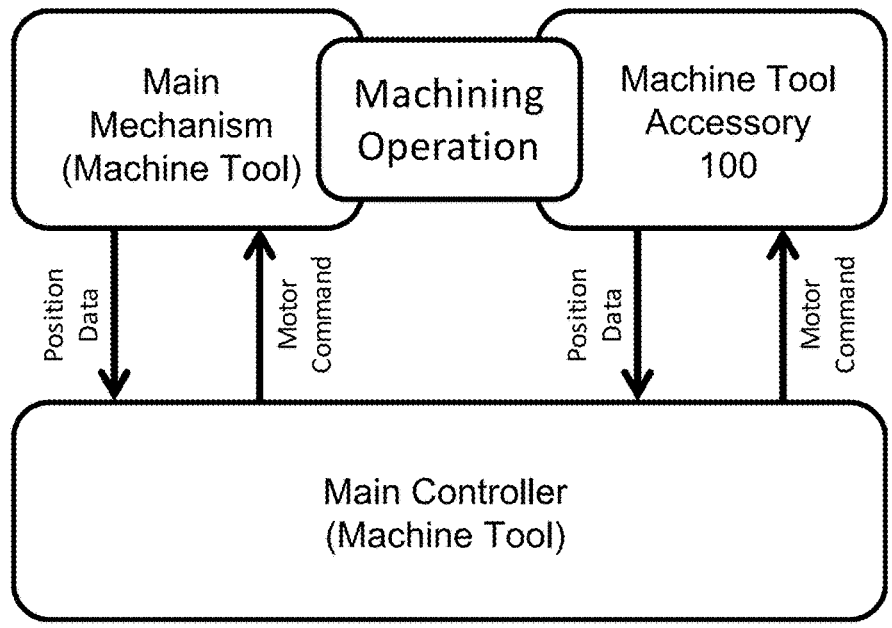
FIG. 4B shows one embodiment of a system with a machine tool accessory using the machine tool controller.

In accordance with another embodiment, shown in FIG. 4A, the tool accessory may further include one more accessory controllers 114, which may be configured to (i) receive information from the main machine tool controller indicative of the main spindle's position, and/or speed, and/or the main machine tool stages' position and/or speed and based on this information, (ii) coordinate the machine tool accessory's spindle and small linear actuator in order to put the machine tool accessory and its rotating tool in an appropriate position at an appropriate time so as to carry out a small-scale and/or high-accuracy machining operation. In other embodiments, and shown in FIG. 4B, the machine tool accessory 100 may interface directly with the main machine tool controller without the use of an accessory controller.

In operation, according to one embodiment, the accessory controller 114 is configured to execute a desired cutting program. In general terms, a cutting program is a set of computer program code or instructions, which when executed by the tool accessory controller causes the tool accessory linear actuator to move to an appropriate position relative to the work piece and, at the appropriate time cause the accessory spindle to come into contact with the work piece.

During execution of a control loop during an example cutting program, the machine tool accessory controller 114 transmits a command signal to the linear actuator, which causes the motor and travel guide, and thus accessory's spindle 112, to move and engage the work piece. During this movement, the position feedback sensor 106 carries out various measurements and returns a feedback signal to the accessory controller 114. The control loop repeats with the accessory controller adjusting the command signal in accordance with the feedback signal. In one embodiment, the machine tool accessory's spindle 112 is moved back and forth, engaging and disengaging the work piece, whereas the tool stage on which the machine tool accessory 100 is mounted is stationary.

Additionally, during the control loop, the machine tool accessory controller 114 receives from a main machine tool controller information indicative of the main spindle's position and/or speed as well as information from the machine tool controller indicative of the machine tool stages' position and/or speed. In accordance with one embodiment, the machine tool accessory controller 114 engages in electronic camming by adjusting its control signal in accordance with the information received from the main machine tool controller. By doing so, the machine tool accessory controller 114 may be able to adjust the accessory spindle 112 and rotating tool in such a way as to compensate for small changes in the position and speed of the machine tool's spindle and stage(s). Accordingly, the machine tool accessory 100 is able to engage in small-scale and high-accuracy machining operations.

One advantage of the above-described embodiments is that the machine tool accessory 100 is able to be used with many different types of machines and function in coordination with the main spindle, the tool stage and any other stages. For instance, in one example operation, the main stage and main spindle is moved to a particular position and a start signal (e.g., an M-code) is sent from the main controller to the accessory controller. Upon receipt of this signal, the accessory controller begins synchronization with the main spindle, and the main spindle is commanded to rotate at a substantially constant speed. The accessory controller will receive from the feedback sensor information indicative of the main spindle's position and, in accordance with the description above, execute its cutting program accordingly.

Figure 5A:
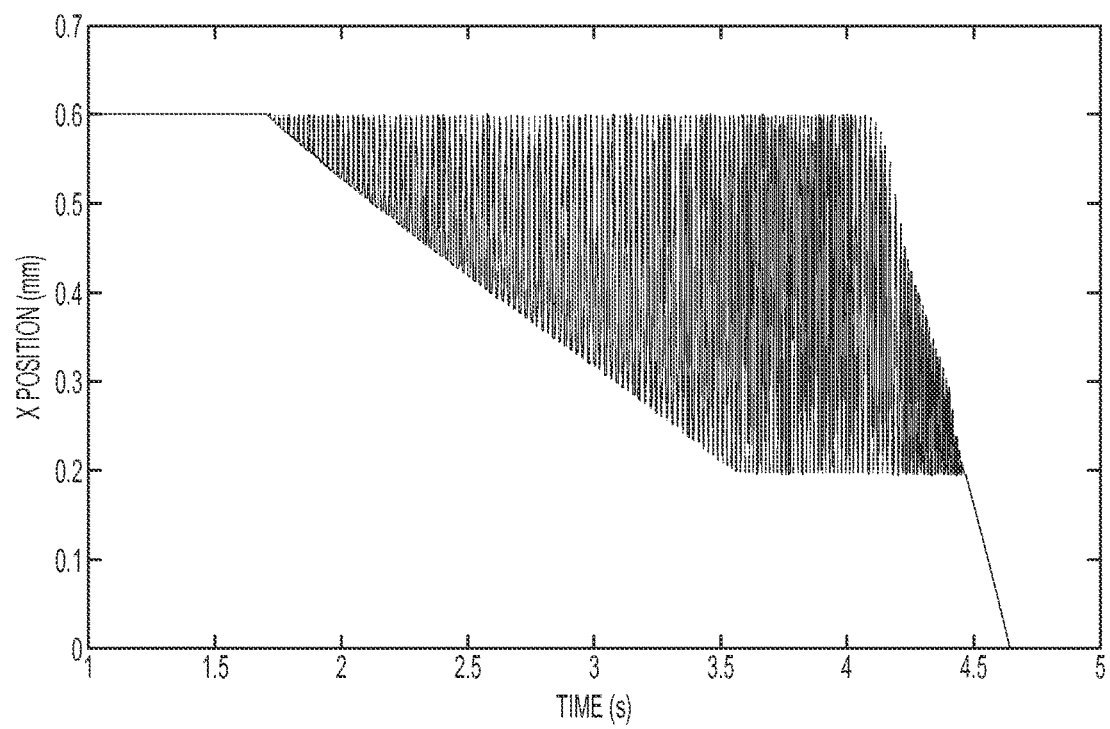
FIG. 5A is a graph depicting an example machine tool accessory motion path, in accordance with one example cutting program.

FIG. 5A is a graph depicting an example tool path of the machine tool accessory 100, in accordance with one example cutting program. In the example depicted, the accessory controller causes the tool to begin a cutting operation at about 1.75 seconds. Over the span of about three seconds, the tool oscillates its position between its initial X-position of 0.6 mm and an increasing total X displacement, ending at about the 3.5 second mark with a total displacement of about 0.4 mm. For about another 1.0 seconds, the tool oscillates between 0.6 mm and 0.4 mm positions. This is merely an example tool path; in other embodiments, other tool paths and cutting operations are possible as well.

Figure 5B:
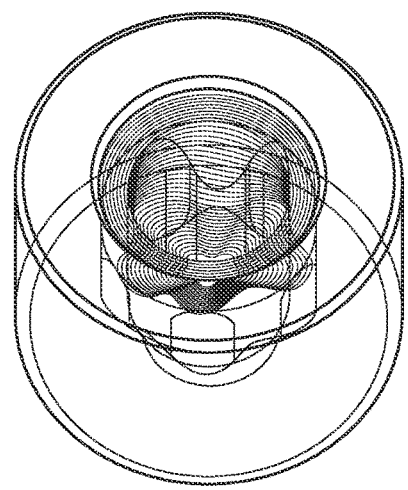
FIG. 5B is a 3D graph depicting the example machine tool accessory motion path when combined with the corresponding machine tool main spindle and machine tool-z-stage motion path, in accordance with one example cutting program.

FIG. 5B is a 3D graph depicting an example tool path of the machine tool accessory 100 combined with example motions of the main spindle and one of the machine tool stages, in accordance with one example cutting program. In the example depicted, the machine accessory motion shown in FIG. 5A is combined with constant speed motion of the main spindle and the machine tool Z-stage. As shown, the oscillations of the machine accessory produce a lobed shape as the machine tool Z-stage moves the accessory deeper into the work piece. This is merely an example tool path; in other embodiments, other tool paths and cutting operations are possible as well.

Figure 6:
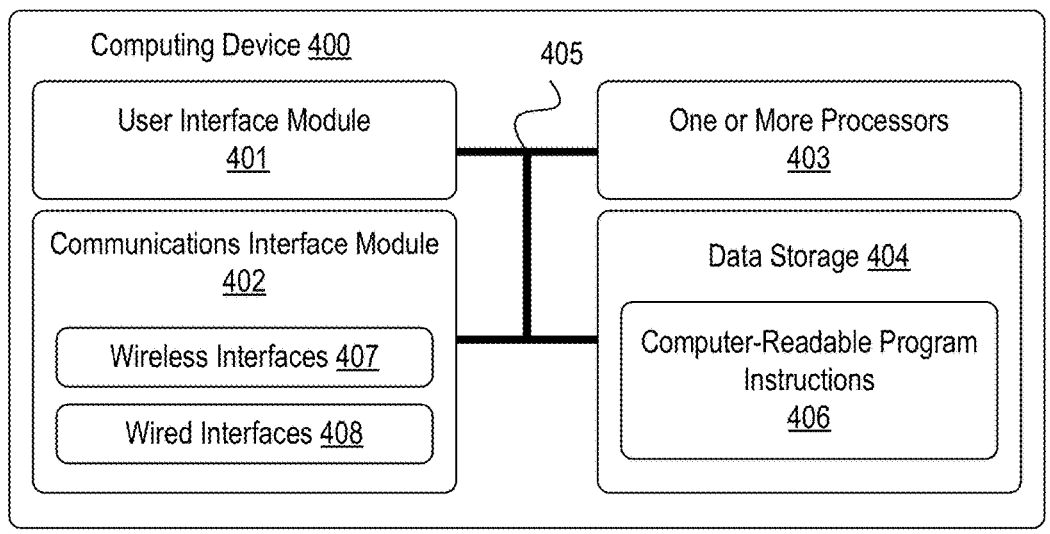
FIG. 6 is a block diagram of a computing device in accordance with an embodiment.

FIG. 6 is a block diagram of a computing device 400 in accordance with an example embodiment. Computing device 400 may embody the tool accessory controller 114 or main spindle controller, as described above. The computing device 400 may include a user interface module 401, a communication interface module 402, one or more processors 403, and data storage 404, all of which may be linked together via a system bus, network, or other connection mechanism 405.

The user interface module 401 is generally configured to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed. The user interface module 401 may be used to enter data for use with the methods and systems disclosed herein.

The communications interface module 402 can include one or more wireless interfaces 406 and/or wired interfaces 408 that are configurable to communicate with one or more other controllers or components. For example, communications interface module 402 may be configured to communicate with the tool accessory's linear actuator, linear position feedback device, travel guide, and/or the spindle. The communications interface module 402 may also be configured to communicate with one or more other computing devices similar to computing device 400, such as a main spindle controller. The wireless interfaces 406 can include one or more wireless transceivers, such as a Bluetooth transceiver, a Wi-Fi transceiver, or other wireless transceiver. The wired interfaces 408 can include one or more wired transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wired network.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions to carry out one or more of the functions described herein.

The data storage 404 can include one or more computer-readable storage media that can be read or accessed by at least one of the one or more processors 403. The or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 44 and perhaps additional data. In some embodiments, the data storage 404 can additionally include storage required to perform at least part of the herein-described techniques, methods, and/or at least part of the functionality of the herein-described devices and networks.

The invention claimed is:

1. A machine tool accessory comprising:
   a monolithic flexure travel guide comprising a base and a moveable portion, the base and the moveable portion being connected by flexible sections;
   an accessory tool spindle configured to rotate a tool, the accessory tool spindle being disposed within the moveable portion of the monolithic flexure travel guide;
   a motor configured to move the moveable portion of the monolithic flexure travel guide with respect to the base; and
   a position feedback sensor configured to measure position of the moveable portion of the monolithic flexure travel guide with respect to the base.

2. The machine tool accessory of claim 1, wherein the monolithic flexure travel guide serves as a base of the machine tool accessory.

3. The machine tool accessory of claim 1, wherein the motor comprises a voice coil motor.

4. The machine tool accessory of claim 1 further comprising a controller configured to (i) communicatively couple to the motor, (ii) communicatively couple to one or more external devices, and (iii) cause the motor to move the moveable portion of the monolithic flexure travel guide and, thus, the accessory tool spindle in response to signals received from the one or more external devices.

5. The machine tool accessory of claim 4, wherein the controller is further configured to (iv) receive from the position feedback sensor signals indicative of the linear position of the tool spindle, and (v) cause the linear actuator to move the moveable portion of the monolithic flexure travel guide and, thus, the accessory tool spindle in response to signals received from the linear position feedback device and signals received from the one or more external devices.

6. The machine tool accessory of claim 4, wherein the one or more external devices comprise a main controller of a machine tool.

7. The machine tool accessory of claim 4, wherein the controller comprises:
   a non-transitory computer readable medium (CRM);
   one or more processors; and
   instructions stored on the CRM and executable by the one or more processors for carrying out functions, the functions including:

receiving from a main machine tool controller first information indicative of a main spindle's position or speed;

receiving from a linear position feedback device second information indicative of a linear position or speed of the tool spindle and/or a main stage; and based on the first information and second information, transmitting to the linear actuator one or more cutting instructions that are configured to cause the linear actuator to move the accessory tool spindle in such a way so as to carry out a machining operation.

8. The machine tool accessory of claim 7, wherein the main spindle includes a work piece, wherein the accessory tool spindle includes a tool, and wherein the cutting instructions are configured to cause the motor to move the accessory tool spindle such that the tool comes into contact with the work piece and thereby performs a machining operation.

9. The machine tool accessory of claim 1 wherein the tool accessory communicates with a main machine tool controller, the main machine tool controller being configured to (i) communicatively couple to the motor, (ii) communicatively couple to one or more external devices, and (iii) cause the motor to move the accessory tool spindle in response to signals received from the one or more external devices.

10. The tool accessory of claim 1, wherein the machine tool accessory is mounted on a separately movable tool stage.

11. A machine tool accessory comprising:

an accessory spindle configured to rotate a tool, the accessory spindle being disposed within a monolithic flexure guide, wherein the monolithic flexure guide comprises a base and a moveable portion, the base and the moveable portion being connected by flexible sections;

a voice coil motor configured to move the accessory spindle laterally relative to the accessory spindle axis, the voice coil motor being configured to move the moveable portion of the monolithic flexure guide with respect to the base, and thereby move the spindle;

a controller configured to (i) communicatively couple to the voice coil motor, (ii) communicatively couple to one or more external devices, and (iii) cause the voice coil motor to move the accessory spindle in response to signals received from the one or more external devices; and a position feedback sensor configured to measure the position of the voice coil motor and the moveable portion of the monolithic flexure guide with respect to the base and communicate the position to the controller.

12. The machine tool accessory of claim 11 wherein the monolithic flexure guide serves as a base of the machine tool accessory.

* * * * *